(12) United States Patent
Khedkar et al.

(10) Patent No.: US 11,102,006 B2
(45) Date of Patent: Aug. 24, 2021

(54) BLOCKCHAIN INTELLIGENT SECURITY IMPLEMENTATION

(71) Applicant: ACCENTURE GLOBAL SOLUTIONS LIMITED, Dublin (IE)

(72) Inventors: Nikhil Chandrakant Khedkar, Thane (IN); Neville Dubash, Mumbai (IN); Sanjay Podder, Thane (IN); Prashant Sahadev Sawant, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 288 days.

(21) Appl. No.: 16/258,178

(22) Filed: Jan. 25, 2019

(65) Prior Publication Data

US 2020/0244457 A1 Jul. 30, 2020

(51) Int. Cl.
*H04L 9/32* (2006.01)
*H04L 9/06* (2006.01)
*H04W 4/14* (2009.01)

(52) U.S. Cl.
CPC .......... *H04L 9/3226* (2013.01); *H04L 9/0637* (2013.01); *H04L 9/0643* (2013.01); *H04L 9/3297* (2013.01); *H04W 4/14* (2013.01); *H04L 2209/38* (2013.01)

(58) Field of Classification Search
CPC .................................................... H04L 9/3226
See application file for complete search history.

(56) References Cited

U.S. PATENT DOCUMENTS

| | | | | |
|---|---|---|---|---|
| 9,300,644 | B1* | 3/2016 | Dubey | H04L 63/0815 |
| 9,780,950 | B1* | 10/2017 | Dundas | H04L 9/006 |
| 2018/0205725 | A1* | 7/2018 | Cronkright | H04L 63/0838 |
| 2018/0232526 | A1* | 8/2018 | Reid | H04L 9/3271 |
| 2018/0254898 | A1* | 9/2018 | Sprague | H04L 9/3271 |

\* cited by examiner

*Primary Examiner* — Simon P Kanaan
(74) *Attorney, Agent, or Firm* — Mannava & Kang, P.C.

(57) ABSTRACT

In some examples, Blockchain intelligent security implementation may include determining whether a Blockchain transaction has been initiated, generating, based on a determination that the Blockchain transaction has been initiated, a password, and storing the generated password. The stored password may be forwarded to a user associated with the Blockchain transaction. A further password may be received from the user associated with the Blockchain transaction, and validated, based on comparison of the stored password to the further password. Based on the validation of the further password, the Blockchain transaction may be processed.

20 Claims, 12 Drawing Sheets

800

```
┌─────────────────────────────────────────────────────────────┐
│ DETERMINE, BY AT LEAST ONE HARDWARE PROCESSOR, WHETHER A    │
│ BLOCKCHAIN TRANSACTION HAS BEEN INITIATED                    │
│ 802                                                          │
└─────────────────────────────────────────────────────────────┘
                              │
                              ▼
┌─────────────────────────────────────────────────────────────┐
│ GENERATE, BY THE AT LEAST ONE HARDWARE PROCESSOR AND         │
│ BASED ON A DETERMINATION THAT THE BLOCKCHAIN TRANSACTION     │
│ HAS BEEN INITIATED, A PASSWORD THAT INCLUDES A DETERMINISTIC │
│ COMPONENT AND A RANDOM COMPONENT                             │
│ 804                                                          │
└─────────────────────────────────────────────────────────────┘
                              │
                              ▼
┌─────────────────────────────────────────────────────────────┐
│ STORE, BY THE AT LEAST ONE HARDWARE PROCESSOR, THE           │
│ GENERATED PASSWORD                                           │
│ 806                                                          │
└─────────────────────────────────────────────────────────────┘
                              │
                              ▼
┌─────────────────────────────────────────────────────────────┐
│ FORWARD, BY THE AT LEAST ONE HARDWARE PROCESSOR, THE         │
│ STORED PASSWORD TO A USER ASSOCIATED WITH THE BLOCKCHAIN     │
│ TRANSACTION                                                  │
│ 808                                                          │
└─────────────────────────────────────────────────────────────┘
                              │
                              ▼
┌─────────────────────────────────────────────────────────────┐
│ RECEIVE, BY THE AT LEAST ONE HARDWARE PROCESSOR, A FURTHER   │
│ PASSWORD FROM THE USER ASSOCIATED WITH THE BLOCKCHAIN        │
│ TRANSACTION                                                  │
│ 810                                                          │
└─────────────────────────────────────────────────────────────┘
                              │
                              ▼
                            ( A )
```

*FIG. 8*

BLOCKCHAIN INTELLIGENT SECURITY IMPLEMENTATION

BACKGROUND

A Blockchain may be described as a list of records that are linked using cryptography. The records may be denoted blocks. Each of the blocks may include information such as a cryptographic hash of the previous block, a timestamp, and transaction data.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
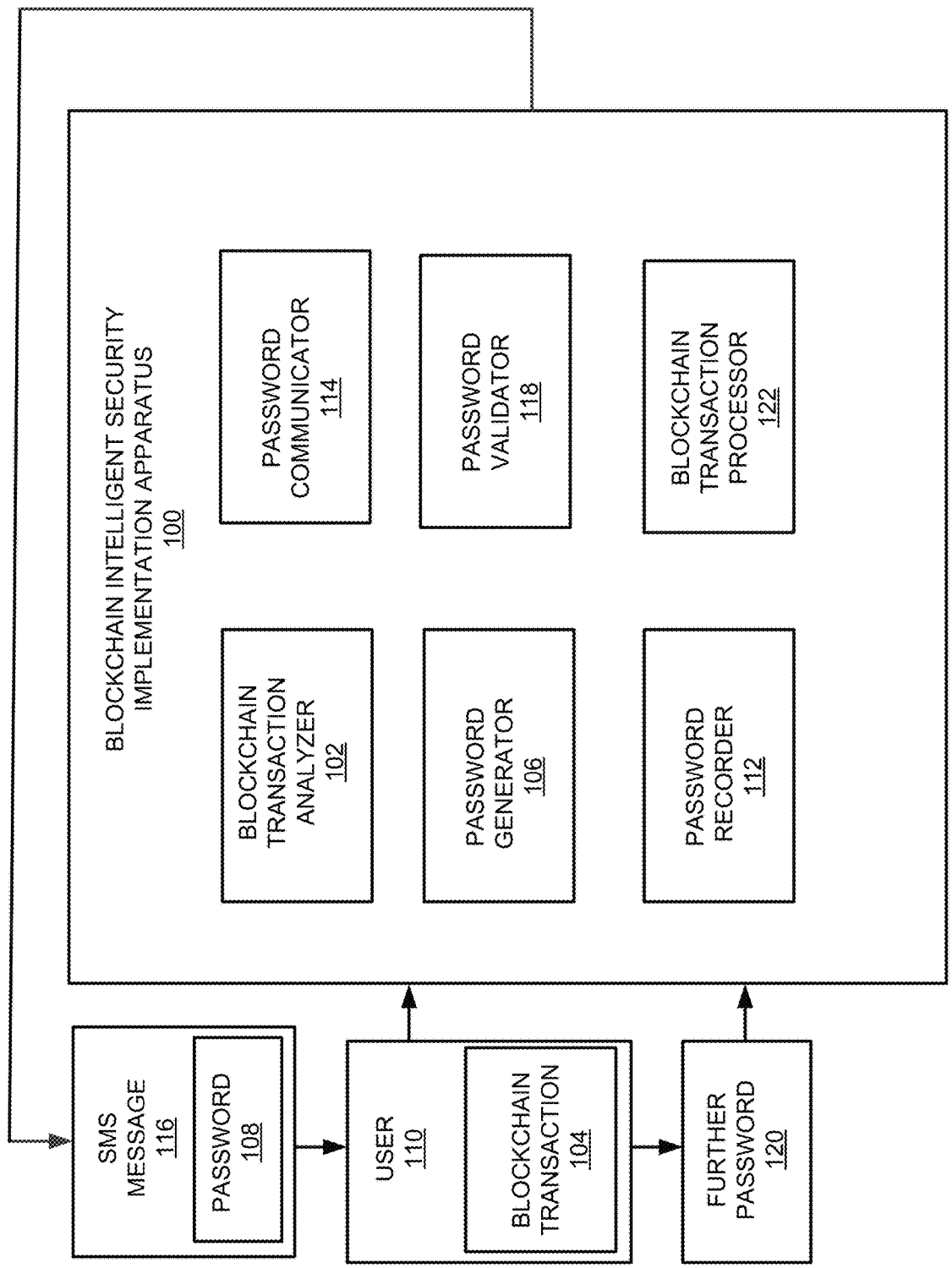
FIG. 1 illustrates a layout of a Blockchain intelligent security implementation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Blockchain intelligent security implementation apparatuses, methods for Blockchain intelligent security implementation, and non-transitory computer readable media having stored thereon machine readable instructions to provide Blockchain intelligent security implementation are disclosed herein. The apparatuses, methods, and non-transitory computer readable media disclosed herein provide for Blockchain intelligent security implementation by utilizing a secret message (e.g., through a password such as a one-time-password) exchange directly between a Blockchain and a user, where the Blockchain may confirm that the user has indeed initiated a Blockchain transaction, before writing to a ledger of the Blockchain. This would ensure that even if an intermediate front end application is compromised, the front end application would not be permitted to write malicious data to the Blockchain on the user's behalf. Instead, the front end may be leveraged to provide a rich and seamless user experience.

With respect to Blockchain technology, users may participate in a Blockchain ecosystem by hosting their Blockchain nodes, which may require infrastructure provisioning. Alternatively, users may be handed over their private keys on signing-up. In this regard, users may need to provide their private keys to authenticate themselves to interact with a Blockchain. The private keys may need to be securely stored by users. Alternatively, the private keys may be stored by a back-end information technology system, and not by the users. This storage technique may remove the need and overhead associated with storage of the private keys by users. However, a user may have limited control over the private key, which may adversely impact trust in the system if a private key is compromised.

According to another example, when a web browser is to connect to a Blockchain, a third party browser plugin may be needed for such a connection. Alternatively, a third party mobile application may be needed for connection to a Blockchain. In both of these cases, the third party may need to be trusted, which may take the trust away from Blockchain.

It is therefore technically challenging to implement a seamless user experience, without the need to store a private key in a back-end information technology system, or without the need to utilize multiple user interfaces (e.g., web browsers, mobile applications, etc.) to retain trust with the Blockchain. It is also technically challenging to provide a user with ultimate control over what is written to a Blockchain on the user's behalf. Yet further, it is also technically challenging to implement individual user-level identity on a Blockchain.

In order to address at least the aforementioned technical challenges, the apparatuses, methods, and non-transitory computer readable media disclosed herein provide for Blockchain intelligent security implementation by utilizing a secret message (e.g., through a password such as a one-time-password) exchange directly between a Blockchain and a user, where the Blockchain may confirm that the user has indeed initiated a Blockchain transaction, before writing to a ledger of the Blockchain.

The password such as the one-time-password as disclosed herein may include a deterministic component. In this regard, the deterministic aspect of the password may mean that the same password should be generated every time the same code is executed. This is because in a Blockchain, every endorser node may execute a smart contract individually to confirm the result itself. Once all of the endorser nodes generate the same password, the endorser nodes may reach consensus and store within their own Blockchain ledger for verification at a later point.

With respect to communication of the password such as the one-time-password through a secret message directly between a Blockchain and a user as disclosed herein, if the password is communicated to the user through a front end application, then an intermediate information technology system may be able to read the password, and utilize this information to execute any Blockchain transaction on the user's behalf. In order to eliminate this possibility, the password may be communicated directly between a Blockchain and a user as disclosed herein, without the intermediate information technology system.

The secret message as disclosed herein may include a short message service (SMS) message. In this regard, a user may interact with a Blockchain through front and back end information technology systems, which may make these points of vulnerability for any fraudulent modifications, especially for generating the password. Thus, as disclosed herein, the secret message may include information to provide a user a mechanism to confirm directly from the Blockchain, the Blockchain transaction for which the password is generated. Thus, the secret message may include the Blockchain transaction details along with password.

According to examples disclosed herein, the apparatuses, methods, and non-transitory computer readable media disclosed herein may add another layer of authentication before immutably writing to a Blockchain ledger.

According to examples disclosed herein, the password, such as the one-time-password, may be valid for single use only.

According to examples disclosed herein, the secret message may be sent to a user directly from a Blockchain through a third party text messaging system, thereby bypassing a middle information technology system to avoid fraudulent manipulation thereby.

According to examples disclosed herein, the password, such as the one-time-password, may be generated by a Blockchain smart contract using a customized deterministic algorithm, which may utilize user details and other inputs of a triggered Blockchain transaction.

According to examples disclosed herein, the secret message as disclosed herein may provide a user sufficient details for the user to validate the triggered Blockchain transaction.

According to examples disclosed herein, the password may be sent back to the Blockchain through an existing front end for improving user experience.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example Blockchain intelligent security implementation apparatus (hereinafter also referred to as "apparatus 100").

Referring to FIG. 1, the apparatus 100 may include a Blockchain transaction analyzer 102 that is executed by at least one hardware processor (e.g., the hardware processor 702 of FIG. 7, and/or the hardware processor 904 of FIG. 9) to determine whether a Blockchain transaction 104 has been initiated.

A password generator 106 that is executed by at least one hardware processor (e.g., the hardware processor 702 of FIG. 7, and/or the hardware processor 904 of FIG. 9) may generate, based on a determination that the Blockchain transaction 104 has been initiated, a password 108.

According to examples disclosed herein, the password 108 may represent a one-time-password (OTP). In this regard, the password 108 may be valid for a specified time duration (e.g., one minute), and for a specified Blockchain transaction as disclosed herein.

According to examples disclosed herein, the password 108 may include a deterministic component and a random component.

According to examples disclosed herein, the password generator 106 may generate, based on the determination that the Blockchain transaction 104 has been initiated, the password 108 by ascertaining a plurality of user inputs associated with a user 110 associated with the Blockchain transaction 104. Further, the password generator 106 may ascertain a hash of a previous block associated with the Blockchain transaction 104. The password generator 106 may generate the deterministic component of the password 108 by performing a hash operation on the plurality of user inputs associated with the user 110 associated with the Blockchain transaction 104. Further, the password generator 106 may generate the random component of the password 108 by performing a hash operation on the hash of the previous block associated with the Blockchain transaction 104.

According to examples disclosed herein, the plurality of user inputs may include, for example, a user identification associated with the user 110 associated with the Blockchain transaction 104, an input from the user 110 associated with the Blockchain transaction 104, a latest sequence number of the user 110 associated with the Blockchain transaction 104, and/or a seed value for a deterministic component of the password 108.

A password recorder 112 that is executed by at least one hardware processor (e.g., the hardware processor 702 of FIG. 7, and/or the hardware processor 904 of FIG. 9) may store the generated password 108 (e.g., where the password 108 may hereinafter be designated as stored password 108).

According to examples disclosed herein, the password recorder 112 may store the generated password 108 by mapping the generated password to a Blockchain transaction identification. Further, the password recorder 112 may store the generated password 108 in association with the Blockchain transaction identification. The password recorder 112 may store the generated password 108 in a ledger on individual Blockchain peer nodes.

A password communicator 114 that is executed by at least one hardware processor (e.g., the hardware processor 702 of FIG. 7, and/or the hardware processor 904 of FIG. 9) may forward the stored password 108 to the user 110 associated with the Blockchain transaction 104.

According to examples disclosed herein, the password communicator 114 may forward the stored password 108 to the user 110 associated with the Blockchain transaction 104 by generating a short message service (SMS) message 116 that includes the stored password 108. Further, the password communicator 114 may forward, from a Blockchain associated with the Blockchain transaction, the SMS message 116 to the user 110 associated with the Blockchain transaction 104.

According to examples disclosed herein, the password communicator 114 may generate the SMS message 116 that includes the stored password 108 by generating the SMS message 116 that includes the stored password 108, user information associated with the user 110 associated with the Blockchain transaction 104, and transaction information associated with the Blockchain transaction 104.

A password validator 118 that is executed by at least one hardware processor (e.g., the hardware processor 702 of FIG. 7, and/or the hardware processor 904 of FIG. 9) may receive a further password 120 from the user 110 associated with the Blockchain transaction 104. The further password 120 may represent a password, such as the password 108, which is entered by the user 110. Further, the password validator 118 may validate, based on comparison of the stored password 108 to the further password 120 received from the user 110 associated with the Blockchain transaction 104, the further password 120.

According to examples disclosed herein, the password validator 118 may validate, based on comparison of the stored password 108 to the further password 120 received from the user 110 associated with the Blockchain transaction 104, the further password 120 by determining, based on the comparison of the stored password 108 to the further password 120 received from the user associated with the Blockchain transaction 104, whether the stored password 108 matches the further password 120. Based on a determination that the stored password 108 does not match the further password 120, the password validator 118 may generate a validation failure indication. In this regard, processing of the Blockchain transaction 104 may be terminated (e.g., not written to the Blockchain ledger). Further, based on a determination that the stored password 108 matches the further password 120, the password validator 118 may generate a validation approval indication. In this regard, processing of the Blockchain transaction 104 may be completed.

With respect to a determination that the stored password 108 does not match the further password 120, where the password validator 118 may generate a validation failure indication, the validation failure indication may indicate a possible attempt to maliciously modify some of the inputs of the Blockchain transaction. In this regard, processing related to the Blockchain transaction may be terminated. Further, any processing related to the Blockchain associated with the Blockchain transaction may be terminated to prevent any further malicious attempts to modify contents of the Blockchain.

A Blockchain transaction processor 122 that is executed by at least one hardware processor (e.g., the hardware processor 702 of FIG. 7, and/or the hardware processor 904 of FIG. 9) may process, based on the validation of the further password 120, the Blockchain transaction 104.

With respect to other examples of application of the apparatus 100, for an example of "crypto-token" transfer between multiple users, all of these users may use a browser-based front-end system to transfer tokens amongst them, which is backed by a back-end system. In this example, the users may place complete trust in the front-end and back-end systems. The back-end system may write the token transfer transactions to the Blockchain to bring in trust and transparency. However, since the users do not interact with the Blockchain directly and instead use front-end and back-end systems to interact with the Blockchain, this trust model may be comprised. For example, the front-end and back-end systems may potentially write fraudulent transactions on its users' behalf. In this regard, with respect to the apparatus 100, the users no longer have to trust the front-end and back-end systems, and may be completely assured that only the authentic transactions are written to the Blockchain. Any fraudulent transaction (if at all), by the front-end and back-end system may be caught by the user and hence would not be written to the Blockchain. This example of application of the apparatus 100 may be extended to any class of assets that is exchanged between multiple users, who are constrained to use front-end and back-end systems and not interact directly with the Blockchain. From a technical perspective, once the password is verified by the apparatus 100, the transaction may be written to the Blockchain ledger. In the context of the "crypto-token" example described above, for a User-A transferring 10 crypto-tokens to a User-B, only after User-A provides the correct one-time password, the transaction of User-A transferring 10 crypto-tokens to User-B would be written to the Blockchain ledger.

Figure 2:
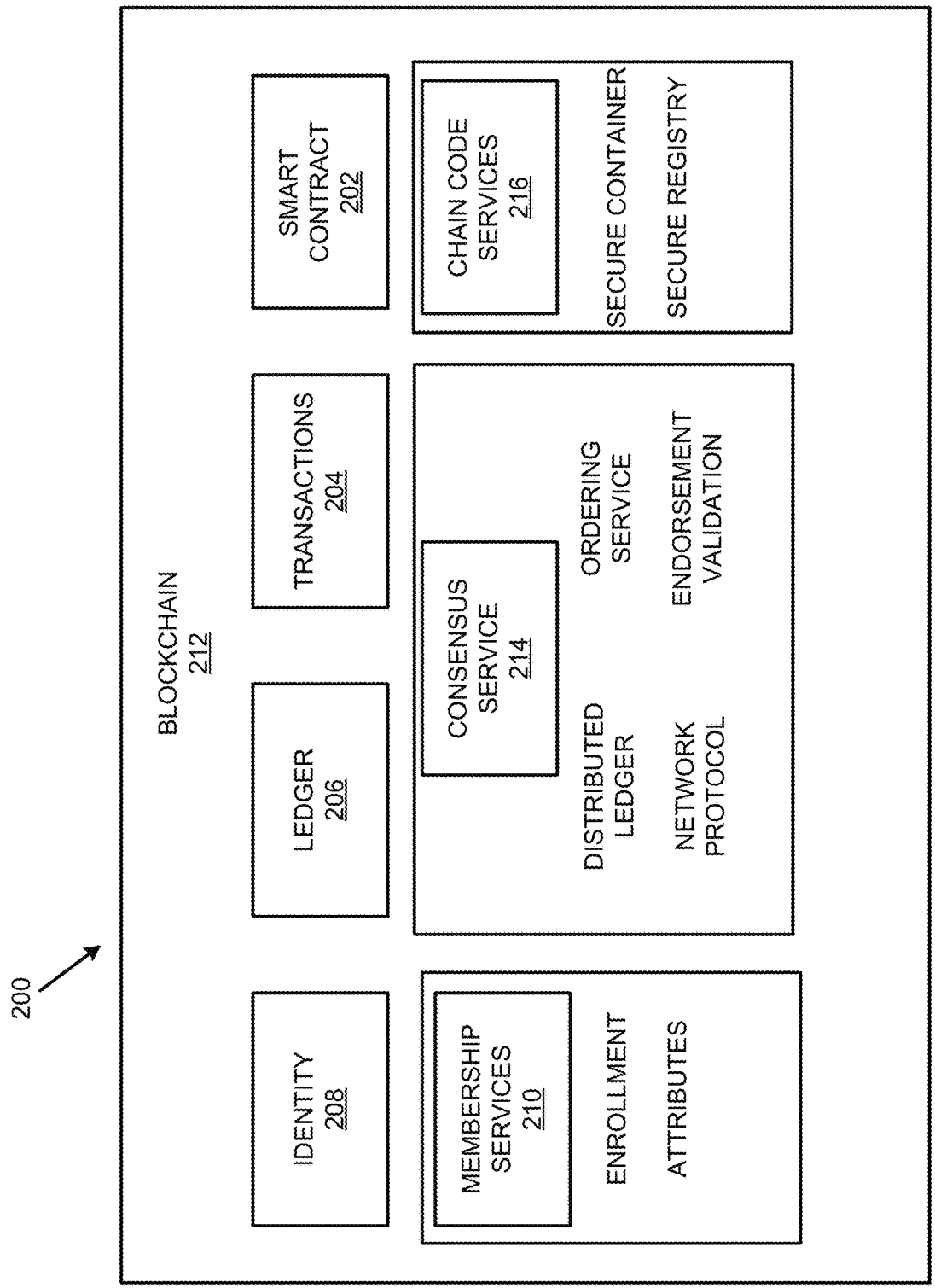
FIG. 2 illustrates a Blockchain architecture to illustrate operation of the Blockchain intelligent security implementation apparatus of FIG. 1 in accordance with an example of the present disclosure.

FIG. 2 illustrates a Blockchain architecture 200 to illustrate operation of the apparatus 100 in accordance with an example of the present disclosure.

Referring to FIG. 2, the smart contract at 202 may include the logic to execute the transactions at 204, which may be placed onto the ledger 206 as disclosed herein upon validation of the password 108. The ledger 206 may include a chain of blocks with cryptography applied onto the transactions 204. The identity block 208, in conjunction with membership services 210, may generate public and private certificates for any new user that is authorized to initiate a transaction for the Blockchain 212. Consensus services 214 may implement rules related to approval of transactions that are executed. Chain code services 216 may implement maintenance related to the smart contract 202.

Figure 3:
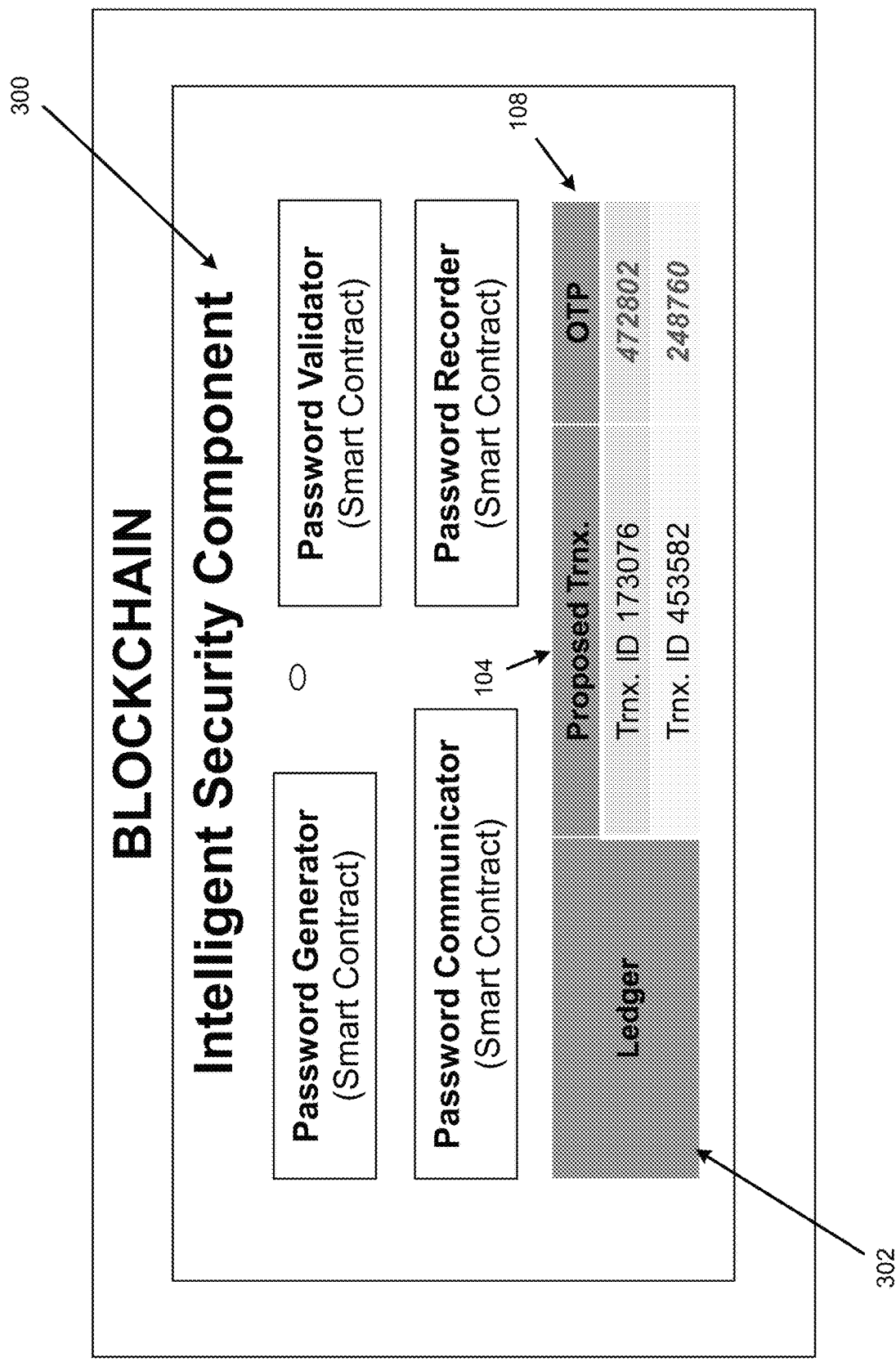
FIG. 3 illustrates an intelligent security component of the Blockchain intelligent security implementation apparatus of FIG. 1 in accordance with an example of the present disclosure.

FIG. 3 illustrates an intelligent security component 300 of the apparatus 100 in accordance with an example of the present disclosure.

Referring to FIG. 3, the intelligent security component 300 may include the password generator 106, the password recorder 112, the password communicator 114, and the password validator 118. The password 108, which is illustrated as a one-time-password, may be stored in a ledger 302 and mapped to an associated Blockchain transaction 104. For example, a password "472802" is shown as being mapped to a Blockchain transaction "Trnx. ID 173076", etc.

Figure 4:
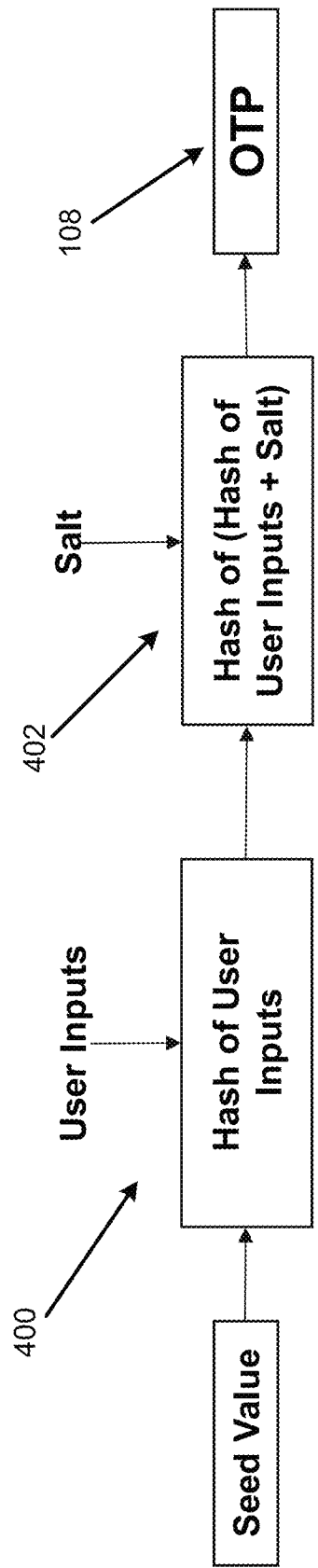
FIG. 4 illustrates password generation to illustrate operation of the Blockchain intelligent security implementation apparatus of FIG. 1 in accordance with an example of the present disclosure.

FIG. 4 illustrates password generation to illustrate operation of the apparatus 100 in accordance with an example of the present disclosure.

Referring to FIG. 4, as disclosed herein, the password generator 106 may generate the deterministic component of the password 108 by performing a hash operation on the plurality of user inputs associated with the user 110 associated with the Blockchain transaction 104. Further, the password generator 106 may generate the random component of the password 108 by performing a hash operation on the hash of the previous block associated with the Blockchain transaction 104. For example, the deterministic component of the password 108 is shown at 400, and the random component of the password 108 is shown at 402.

According to an example, the password 108 may include a six digit secret code. For example, the deterministic component of the password 108 may be determined as a function of a user identification associated with the user 110 associated with the Blockchain transaction 104, a requested Blockchain transaction 104, an input from the user 110 associated with the Blockchain transaction 104, a latest sequence number of the user 110 associated with the Blockchain transaction 104, and/or a seed value. Further, the random component of the password 108 may be determined as "salt", which represents a hash operation performed on the hash of the previous block associated with the Blockchain transaction 104. Thus, the password 108 may be specified as follows:

Password=function of {User ID, Requested Blockchain transaction, Front end inputs from user, Latest sequence number of user, Salt}.

The front end inputs from the user may be described as the details keyed in by the user on a front end screen to carry out a Blockchain transaction (e.g., User A transferring 10 tokens to User B, would have 10 as the front end input from user). The latest sequence number of user may be described as the number of transactions performed by a user thus far, in order to generate a distinct password 108 even if any of the previously executed transactions were exactly the same. A seed value may be described as an initial input provided to the hashing algorithm which is independent of any transaction on which the hashing algorithm works. With respect to a previous block hash, a Blockchain may be described as a chain of blocks. Individual blocks may represent a collection of transactions. Every block may include a link stored to its previous block in the form of a hash of the previous block. The previous block hash may include this hash stored within every block of its previous block.

An example of a password including numerical values may be specified as follows:

Password=function of {'5533394d-8df6-4d4d-8529-3e09376906e7', 'transferTokens', '100', '4', '5f2f060b-a806-4ee1-ac33-75a7aa392592'}

These numerical values may generate a six digit password 108 of 568751. This six digit password 108 may be generated by multiple hashing of all of the inputs, and may not be traced back to the original inputs. According to other examples, the password 108 may be any number of digits (e.g., seven digits, eight digits, etc.).

Figure 5:
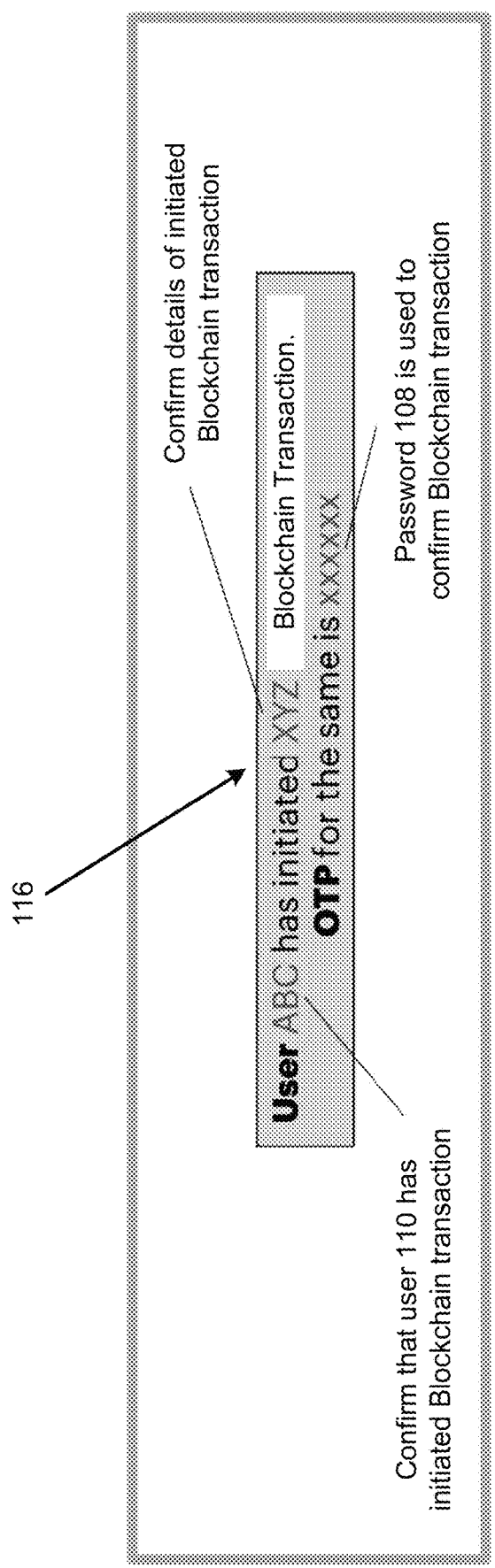
FIG. 5 illustrates a short message service (SMS) message to illustrate operation of the Blockchain intelligent security implementation apparatus of FIG. 1 in accordance with an example of the present disclosure.

FIG. 5 illustrates a short message service (SMS) message to illustrate operation of the apparatus 100 in accordance with an example of the present disclosure.

Referring to FIG. 5, as disclosed herein, the password communicator 114 may generate the SMS message 116 that includes the stored password 108 by generating the SMS message 116 that includes the stored password 108, user information associated with the user 110 associated with the Blockchain transaction 104, and transaction information associated with the Blockchain transaction 104. In this regard, an example of the SMS message 116 may indicate "User ABC has initiated XYZ Blockchain Transaction. OTP for the same is xxxxxx." The user 110 may view the SMS message 116 to confirm that the user has initiated the Blockchain transaction. Further, the user 110 may enter the password 108 as the further password 120 to confirm processing of the Blockchain transaction.

Figure 6:
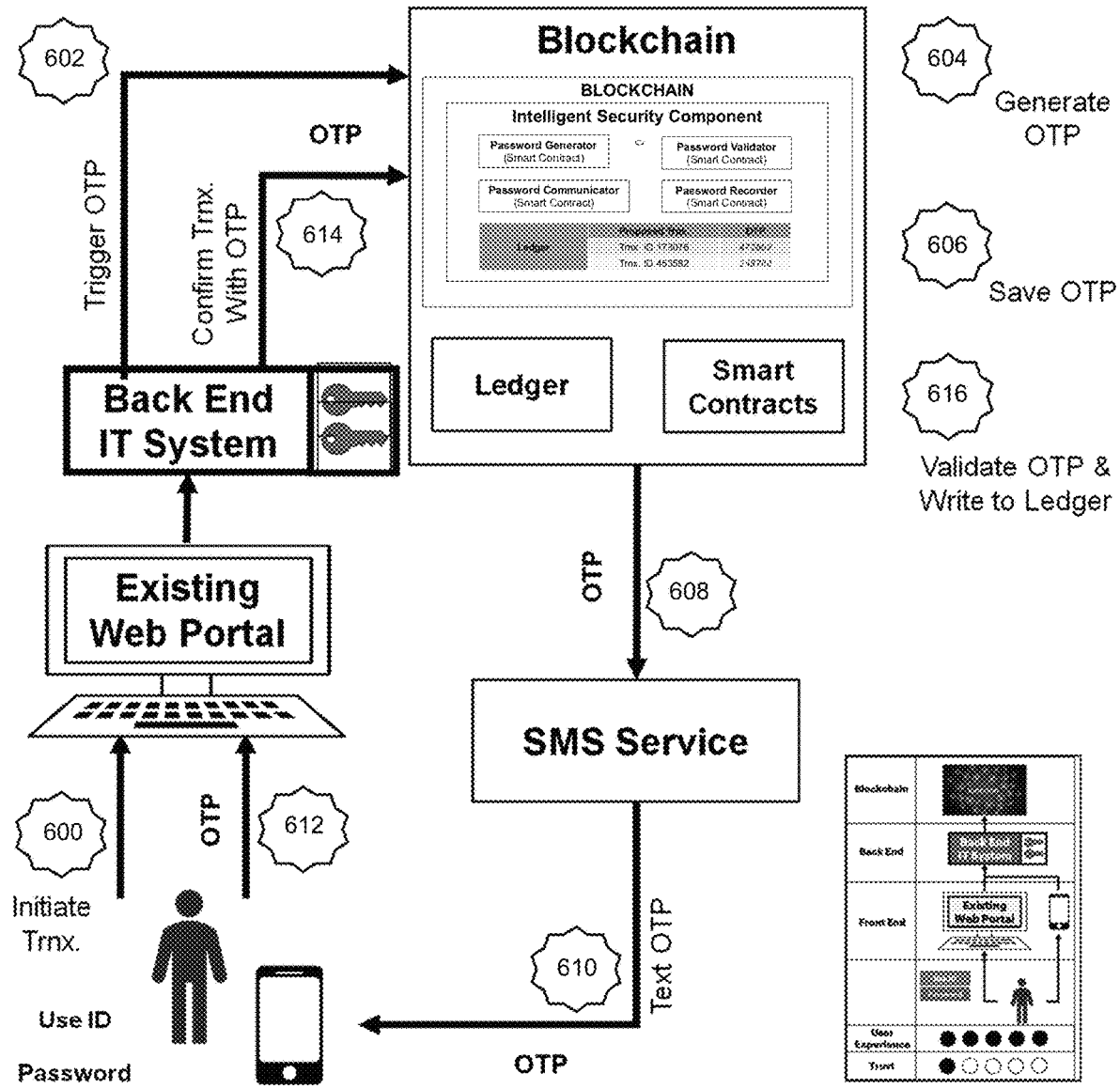
FIG. 6 illustrates a logical flow to illustrate operation of the Blockchain intelligent security implementation apparatus of FIG. 1 in accordance with an example of the present disclosure.

FIG. 6 illustrates a logical flow to illustrate operation of the apparatus 100 in accordance with an example of the present disclosure.

Referring to FIG. 6, at 600, the user 110 may initiate a Blockchain transaction through a front end system. For example, the front end system may include an existing web portal.

At 602, a back end system may invoke a Blockchain application programming interface (API) to request a password (e.g., the password 108, such as a one-time-password) for the user 110.

At 604, the Blockchain may generate, by the password generator 106, the password 108.

At 606, the Blockchain may record, by the password recorder 112, the password 108 against the requested Blockchain transaction.

At 608, the Blockchain may invoke, by the password communicator 114, a third party SMS service to send out the password 108, along with details of the initiated Blockchain transaction for the user 110 to understand and validate.

At 610, the third party SMS service may send out the text message to the user 110.

At 612, the user 110 may confirm the details of the Blockchain transaction, and then enter the password 108 on the front end system as the further password 120.

At 614, the back end system may invoke Blockchain API along with the further password 120.

At 616, the Blockchain, by the password validator 118, may validate the further password 120 against the stored password 108 that has been recorded previously for the requested Blockchain transaction. After successful validation, the Blockchain transaction processor 122 may process the Blockchain transaction, for example, to write the Blockchain transaction to the Blockchain ledger.

According to another example, with respect to steps 600-616 of FIG. 6, any transaction for the user 110 may include a two-step process. For example, in the first step, the user 110 may enter required inputs for the initiated Blockchain transaction. Using all of these inputs, the Blockchain may generate the password 108 as disclosed herein with respect to step 604. This password 108 may be stored on the Blockchain ledger against the initiated Blockchain transaction in the form of a map, where the key for the map may include the initiated Blockchain transaction with the value being the password 108 that is generated. As disclosed herein with respect to step 610, the password 108 may be sent to the user 110 via a text message. In the second step of the two-step process, the user 110 may enter the password 108 as the further password 120 on a front end screen. All of the details of the initiated Blockchain transaction may also be sent to the Blockchain, similar to the first step of the two-step process. This time, the further password 120 may also be sent to the Blockchain as an additional input. In this regard, compared to the processing at steps 614 and 616, instead, the Blockchain may generate a password again independently from the inputs of the initiated Blockchain transaction. The password 108 stored on the Blockchain in the first step may then be looked up from the details of the initiated Blockchain transaction. The looked up password 108 may then be matched with the password generated in the second step for validation of the Blockchain transaction.

Figure 7:
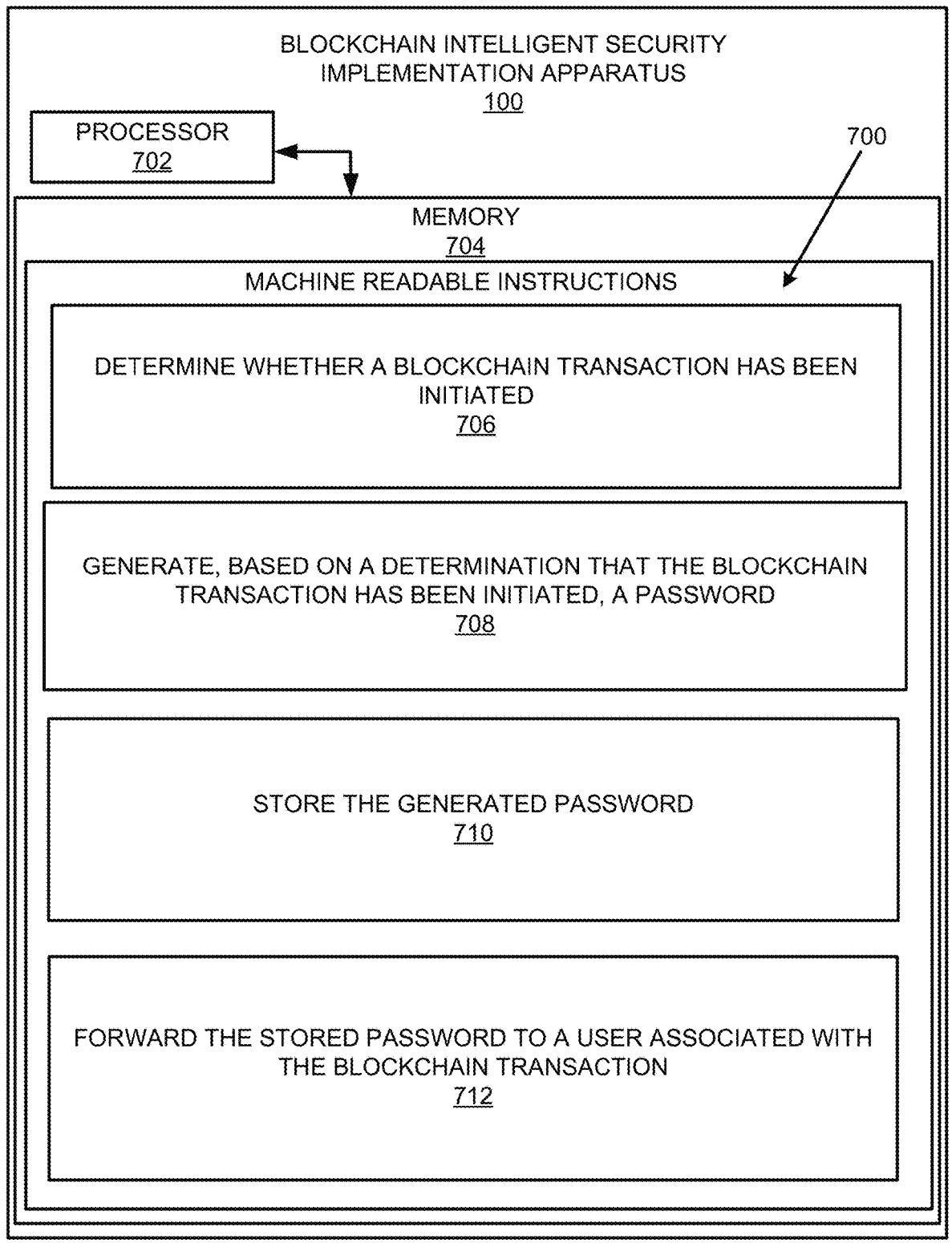
FIG. 7 illustrates an example block diagram for Blockchain intelligent security implementation in accordance with an example of the present disclosure.
Figure 7:
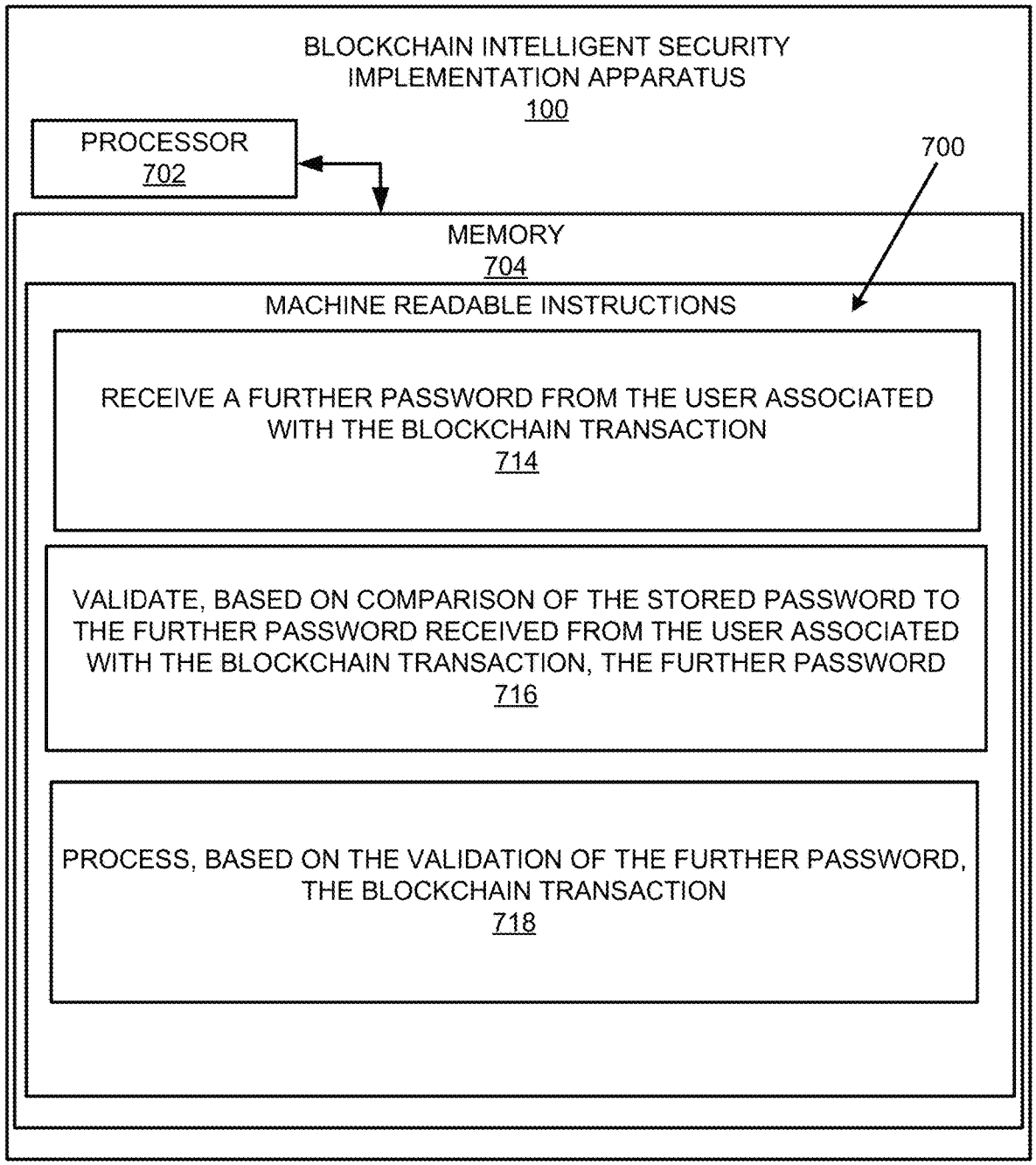
Figure 8:
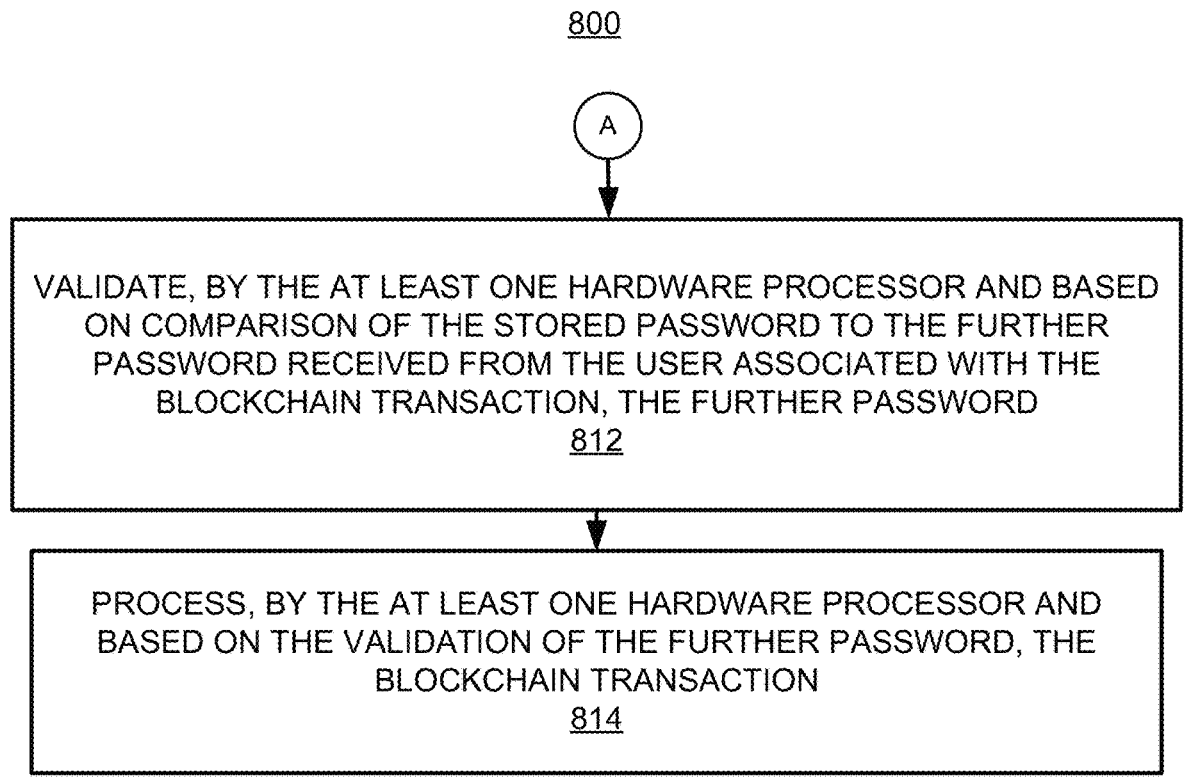
FIG. 8 illustrates a flowchart of an example method for Blockchain intelligent security implementation in accordance with an example of the present disclosure.
Figure 9:
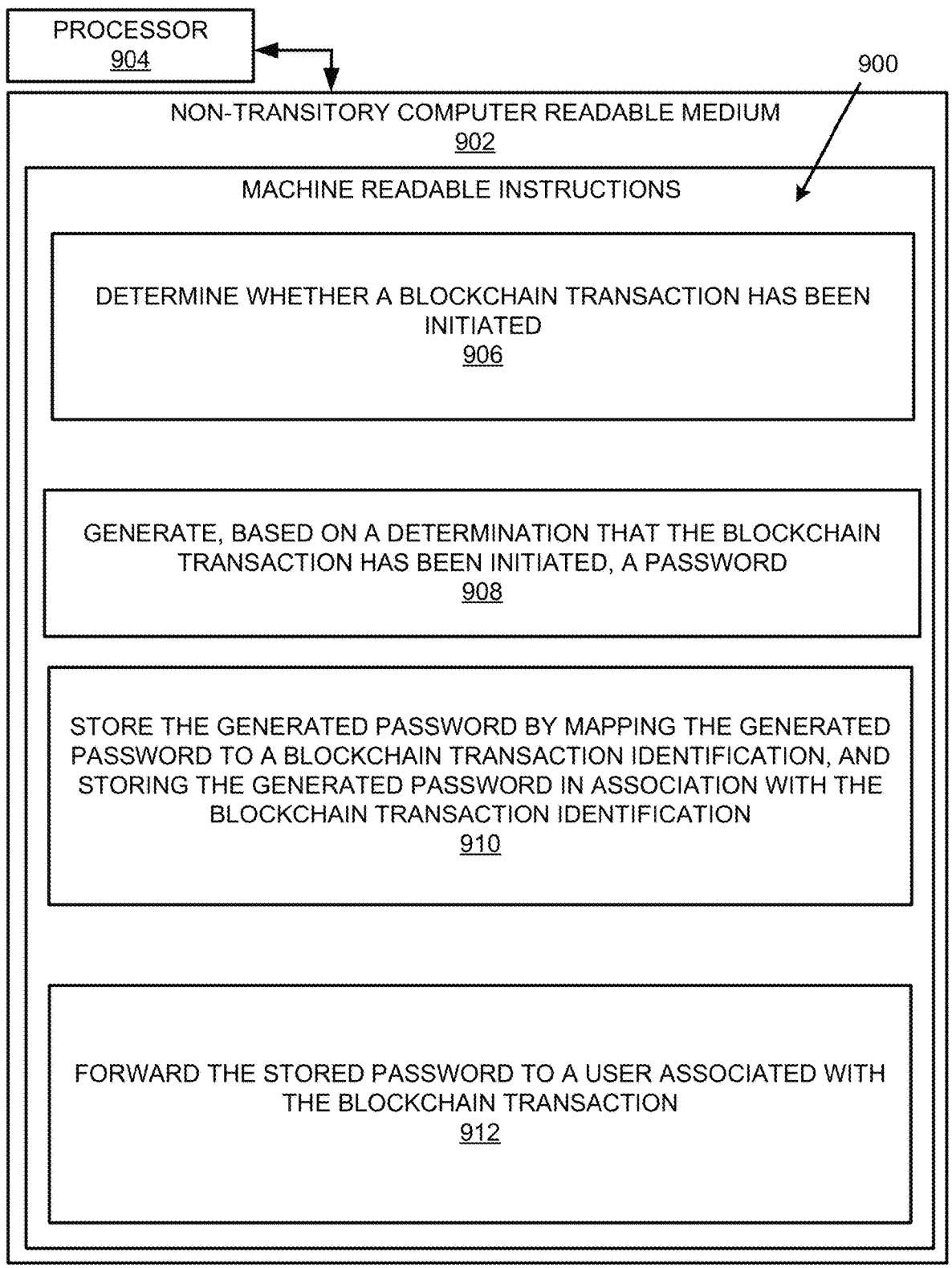
FIG. 9 illustrates a further example block diagram for Blockchain intelligent security implementation in accordance with another example of the present disclosure.
Figure 9:
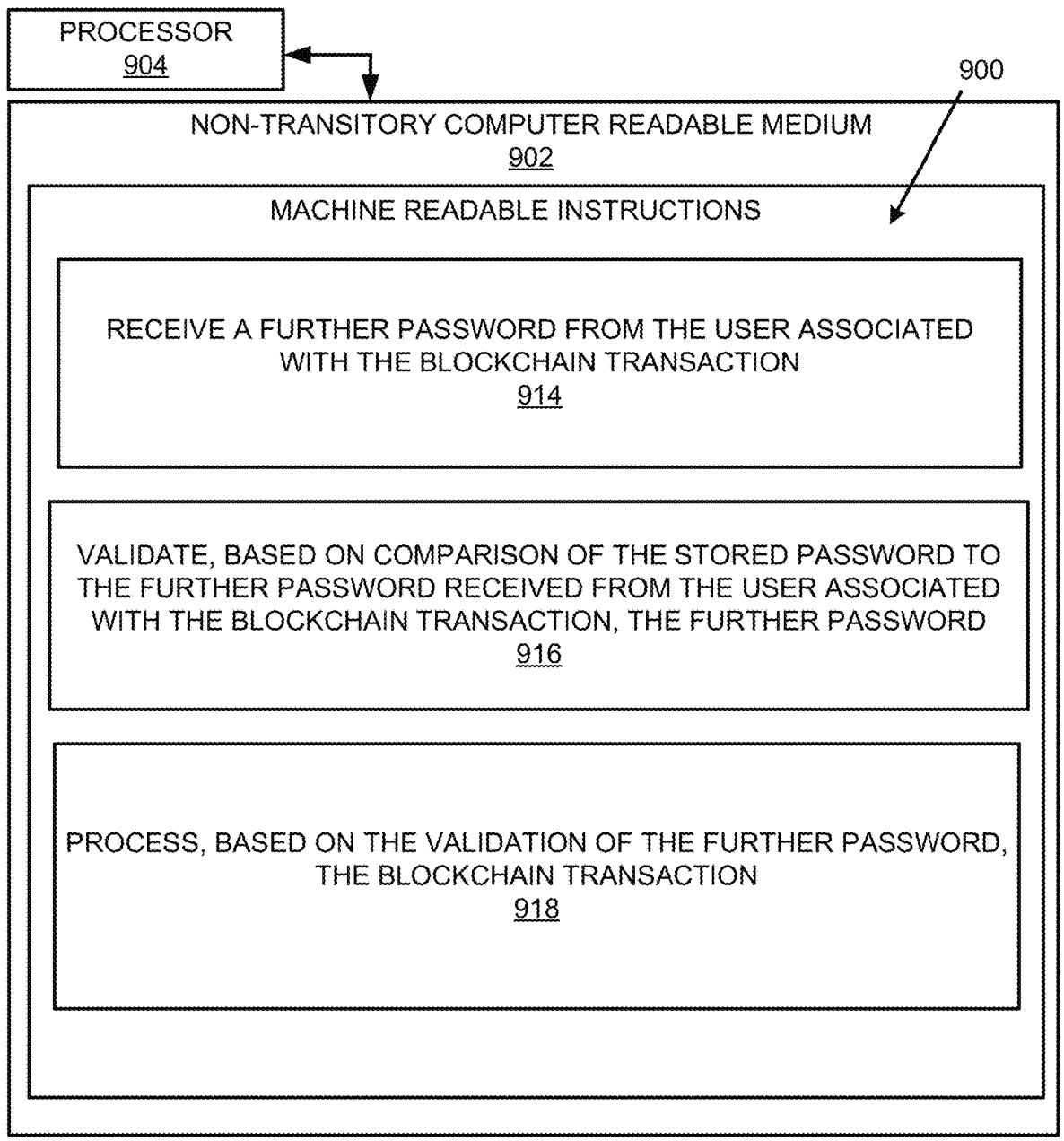

FIGS. 7-9 respectively illustrate an example block diagram 700, a flowchart of an example method 800, and a further example block diagram 900 for Blockchain intelligent security implementation, according to examples. The block diagram 700, the method 800, and the block diagram 900 may be implemented on the apparatus 100 described above with reference to FIG. 1 by way of example and not of limitation. The block diagram 700, the method 800, and the block diagram 900 may be practiced in other apparatus. In addition to showing the block diagram 700, FIG. 7 shows hardware of the apparatus 100 that may execute the instructions of the block diagram 700. The hardware may include a processor 702, and a memory 704 storing machine readable instructions that when executed by the processor cause the processor to perform the instructions of the block diagram 700. The memory 704 may represent a non-transitory computer readable medium. FIG. 8 may represent an example method for Blockchain intelligent security implementation, and the steps of the method. FIG. 9 may represent a non-transitory computer readable medium 902 having stored thereon machine readable instructions to provide Blockchain intelligent security implementation according to an example. The machine readable instructions, when executed, cause a processor 904 to perform the instructions of the block diagram 900 also shown in FIG. 9.

The processor 702 of FIG. 7 and/or the processor 904 of FIG. 9 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to determine whether a Blockchain transaction 104 has been initiated.

The processor 702 may fetch, decode, and execute the instructions 708 to generate, based on a determination that the Blockchain transaction 104 has been initiated, a password 108.

The processor 702 may fetch, decode, and execute the instructions 710 to store the generated password 108.

The processor 702 may fetch, decode, and execute the instructions 712 to forward the stored password 108 to the user 110 associated with the Blockchain transaction 104.

The processor 702 may fetch, decode, and execute the instructions 714 to receive a further password 120 from the user 110 associated with the Blockchain transaction 104.

The processor 702 may fetch, decode, and execute the instructions 716 to validate, based on comparison of the stored password 108 to the further password 120 received from the user 110 associated with the Blockchain transaction 104, the further password 120.

The processor 702 may fetch, decode, and execute the instructions 718 to process, based on the validation of the further password 120, the Blockchain transaction 104.

Referring to FIGS. 1-6 and 8, and particularly FIG. 8, for the method 800, at block 802, the method may include determining whether a Blockchain transaction 104 has been initiated.

At block 804, the method may include generating, based on a determination that the Blockchain transaction 104 has been initiated, a password 108 that includes a deterministic component and a random component.

At block 806, the method may include storing the generated password 108.

At block 808, the method may include forwarding the stored password 108 to the user 110 associated with the Blockchain transaction 104.

At block 810, the method may include receiving a further password 120 from the user 110 associated with the Blockchain transaction 104.

At block 812, the method may include validating, based on comparison of the stored password 108 to the further password 120 received from the user 110 associated with the Blockchain transaction 104, the further password 120.

At block 814, the method may include processing, based on the validation of the further password 120, the Blockchain transaction 104.

Referring to FIGS. 1-6 and 9, and particularly FIG. 9, for the block diagram 900, the non-transitory computer readable medium 902 may include instructions 906 to determine whether a Blockchain transaction 104 has been initiated.

The processor 904 may fetch, decode, and execute the instructions 908 to generate, based on a determination that the Blockchain transaction 104 has been initiated, a password 108.

The processor 904 may fetch, decode, and execute the instructions 910 to store the generated password 108 by mapping the generated password to a Blockchain transaction identification, and storing the generated password in association with the Blockchain transaction identification.

The processor 904 may fetch, decode, and execute the instructions 912 to forward the stored password 108 to the user 110 associated with the Blockchain transaction 104.

The processor 904 may fetch, decode, and execute the instructions 914 to receive a further password 120 from the user 110 associated with the Blockchain transaction 104.

The processor 904 may fetch, decode, and execute the instructions 916 to validate, based on comparison of the stored password 108 to the further password 120 received from the user 110 associated with the Blockchain transaction 104, the further password 120.

The processor 904 may fetch, decode, and execute the instructions 918 to process, based on the validation of the further password 120, the Blockchain transaction 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A Blockchain intelligent security implementation apparatus comprising:
a Blockchain transaction analyzer, executed by at least one hardware processor, to
determine whether a Blockchain transaction has been initiated;
a password generator, executed by the at least one hardware processor, to
generate, based on a determination that the Blockchain transaction has been initiated and by a Blockchain associated with the Blockchain transaction, a password;
a password recorder, executed by the at least one hardware processor, to
store the generated password;
a password communicator, executed by the at least one hardware processor, to
forward, from the Blockchain, the stored password to a user associated with the Blockchain transaction;
a password validator, executed by the at least one hardware processor, to
receive, at the Blockchain, a further password from the user associated with the Blockchain transaction, ascertain, at the Blockchain, the Blockchain transaction;
generate, based on the ascertained Blockchain transaction and by the Blockchain, a new password, and
validate, based on comparison of the stored password and the new password to the further password received from the user associated with the Blockchain transaction, the further password; and
a Blockchain transaction processor, executed by the at least one hardware processor, to
process, based on the validation of the further password, the Blockchain transaction.

2. The apparatus according to claim 1, wherein the password generator is executed by the at least one hardware processor to generate, based on the determination that the Blockchain transaction has been initiated and by the Blockchain associated with the Blockchain transaction, the password by:
ascertaining a plurality of user inputs associated with the user associated with the Blockchain transaction;
ascertaining a hash of a previous block associated with the Blockchain transaction; and
generating the stored password by
performing a hash operation on the plurality of user inputs associated with the user associated with the Blockchain transaction, and
performing a hash operation on the hash of the previous block associated with the Blockchain transaction.

3. The apparatus according to claim 2, wherein the plurality of user inputs include at least two of:
a user identification associated with the user associated with the Blockchain transaction;
an input from the user associated with the Blockchain transaction;
a latest sequence number of the user associated with the Blockchain transaction; or
a seed value for a deterministic component of the stored password.

4. The apparatus according to claim 1, wherein the stored password includes a deterministic component and a random component.

5. The apparatus according to claim 1, wherein the password recorder is executed by the at least one hardware processor to store the generated password by:
mapping the generated password to a Blockchain transaction identification; and
storing the generated password in association with the Blockchain transaction identification.

6. The apparatus according to claim 1, wherein the password communicator is executed by the at least one hardware processor to forward, from the Blockchain, the stored password to the user associated with the Blockchain transaction by:
generating a short message service (SMS) message that includes the stored password; and
forwarding, from the Blockchain associated with the Blockchain transaction, the SMS message to the user associated with the Blockchain transaction.

7. The apparatus according to claim 6, wherein the password communicator is executed by the at least one hardware processor to generate the SMS message that includes the stored password by:
generating the SMS message that includes the stored password, user information associated with the user associated with the Blockchain transaction, and transaction information associated with the Blockchain transaction.

8. The apparatus according to claim 1, wherein the password validator is executed by the at least one hardware processor to validate, based on comparison of the stored password and the new password to the further password received from the user associated with the Blockchain transaction, the further password by:
determining, based on the comparison of the stored password and the new password to the further password received from the user associated with the Blockchain transaction, whether the stored password matches the further password;
based on a determination that the stored password and the new password do not match the further password, generating a validation failure indication; and
based on a determination that the stored password and the new password match the further password, generating a validation approval indication.

9. A method for Blockchain intelligent security implementation, the method comprising:
determining, by at least one hardware processor, whether a Blockchain transaction has been initiated;
generating, by the at least one hardware processor, based on a determination that the Blockchain transaction has been initiated, and by a Blockchain associated with the Blockchain transaction, a password that includes a deterministic component and a random component;
storing, by the at least one hardware processor, the generated password;
forwarding, by the at least one hardware processor and from the Blockchain, the stored password to a user associated with the Blockchain transaction;
receiving, by the at least one hardware processor and at the Blockchain, a further password from the user associated with the Blockchain transaction;
ascertaining, by the at least one hardware processor and at the Blockchain, the Blockchain transaction;
generating, by the at least one hardware processor, based on the ascertained Blockchain transaction, and by the Blockchain, a new password;
validating, by the at least one hardware processor and based on comparison of the stored password and the new password to the further password received from the user associated with the Blockchain transaction, the further password; and
processing, by the at least one hardware processor and based on the validation of the further password, the Blockchain transaction.

10. The method according to claim 9, wherein generating, by the at least one hardware processor, based on the determination that the Blockchain transaction has been initiated, and by the Blockchain associated with the Blockchain transaction, the password that includes the deterministic component and the random component further comprises:
ascertaining, by the at least one hardware processor, a plurality of user inputs associated with the user associated with the Blockchain transaction;
ascertaining, by the at least one hardware processor, a hash of a previous block associated with the Blockchain transaction;
generating, by the at least one hardware processor, the deterministic component of the stored password by performing a hash operation on the plurality of user inputs associated with the user associated with the Blockchain transaction; and
generating, by the at least one hardware processor, the random component of the stored password by performing a hash operation on the hash of the previous block associated with the Blockchain transaction.

11. The method according to claim 10, wherein the plurality of user inputs include at least two of:
a user identification associated with the user associated with the Blockchain transaction;
an input from the user associated with the Blockchain transaction;
a latest sequence number of the user associated with the Blockchain transaction; or
a seed value for the deterministic component of the stored password.

12. The method according to claim 9, wherein storing, by the at least one hardware processor, the generated password further comprises:
mapping, by the at least one hardware processor, the generated password to a Blockchain transaction identification; and
storing, by the at least one hardware processor, the generated password in association with the Blockchain transaction identification.

13. The method according to claim 9, wherein forwarding, by the at least one hardware processor and from the Blockchain, the stored password to the user associated with the Blockchain transaction further comprises:
generating, by the at least one hardware processor, a short message service (SMS) message that includes the stored password; and
forwarding, by the at least one hardware processor and from the Blockchain associated with the Blockchain transaction, the SMS message to the user associated with the Blockchain transaction.

14. The method according to claim 13, wherein generating, by the at least one hardware processor, the SMS message that includes the stored password further comprises:
generating, by the at least one hardware processor, the SMS message that includes the stored password, user information associated with the user associated with the Blockchain transaction, and transaction information associated with the Blockchain transaction.

15. The method according to claim 9, wherein validating, by the at least one hardware processor and based on comparison of the stored password and the new password to the further password received from the user associated with the Blockchain transaction, the further password further comprises:
determining, by the at least one hardware processor and based on the comparison of the stored password and the new password to the further password received from the user associated with the Blockchain transaction, whether the stored password matches the further password;
based on a determination that the stored password and the new password do not match the further password, generating, by the at least one hardware processor, a validation failure indication; and
based on a determination that the stored password and the new password match the further password, generating, by the at least one hardware processor, a validation approval indication.

16. A non-transitory computer readable medium having stored thereon machine readable instructions, the machine readable instructions, when executed by at least one hardware processor, cause the at least one hardware processor to:
determine whether a Blockchain transaction has been initiated;
generate, based on a determination that the Blockchain transaction has been initiated, a password;
store the generated password by
mapping the generated password to a Blockchain transaction identification, and
storing the generated password in association with the Blockchain transaction identification;
forward the stored password to a user associated with the Blockchain transaction;
receive a further password from the user associated with the Blockchain transaction;
validate, based on comparison of the stored password to the further password received from the user associated with the Blockchain transaction, the further password; and
process, based on the validation of the further password, the Blockchain transaction.

17. The non-transitory computer readable medium according to claim 16, wherein the machine readable instructions to generate, based on the determination that the Blockchain transaction has been initiated, the password, when executed by the at least one hardware processor, further cause the at least one hardware processor to:
ascertain a plurality of user inputs associated with the user associated with the Blockchain transaction;
ascertain a hash of a previous block associated with the Blockchain transaction; and
generate the stored password by
performing a hash operation on the plurality of user inputs associated with the user associated with the Blockchain transaction, and
performing a hash operation on the hash of the previous block associated with the Blockchain transaction.

18. The non-transitory computer readable medium according to claim 16, wherein the machine readable instructions to forward the stored password to the user associated with the Blockchain transaction, when executed by the at least one hardware processor, further cause the at least one hardware processor to:
generate a short message service (SMS) message that includes the stored password; and
forward, from a Blockchain associated with the Blockchain transaction, the SMS message to the user associated with the Blockchain transaction.

19. The non-transitory computer readable medium according to claim 18, wherein the machine readable instructions to generate the SMS message that includes the stored password, when executed by the at least one hardware processor, further cause the at least one hardware processor to:
generate the SMS message that includes the stored password, user information associated with the user associated with the Blockchain transaction, and transaction information associated with the Blockchain transaction.

20. The non-transitory computer readable medium according to claim 16, wherein the machine readable instructions to validate, based on comparison of the stored password to the further password received from the user associated with the Blockchain transaction, when executed by the at least one hardware processor, further cause the at least one hardware processor to:
determine, based on the comparison of the stored password to the further password received from the user associated with the Blockchain transaction, whether the stored password matches the further password;

based on a determination that the stored password does
not match the further password,
generate a validation failure indication, and
terminate processing of the Blockchain transaction; and
based on a determination that the stored password
matches the further password,
generate a validation approval indication, and
complete processing of the Blockchain transaction.

* * * * *